(12) United States Patent
Wehrenberg, Jr.

(10) Patent No.: US 12,448,865 B1
(45) Date of Patent: Oct. 21, 2025

(54) METHOD FOR TEMPORARY CLOSURE OF PERFORATION TUNNELS

(71) Applicant: Steve Richard Wehrenberg, Jr., Mustang, OK (US)

(72) Inventor: Steve Richard Wehrenberg, Jr., Mustang, OK (US)

( * ) Notice: Subject to any disclaimer, the term of this patent is extended or adjusted under 35 U.S.C. 154(b) by 0 days.

(21) Appl. No.: 18/831,398

(22) Filed: Jan. 8, 2025

(51) Int. Cl.
| | | |
|---|---|---|
| *E21B 33/14* | (2006.01) | |
| *E21B 33/13* | (2006.01) | |
| *E21B 33/138* | (2006.01) | |
| *E21B 37/00* | (2006.01) | |
| *E21B 47/117* | (2012.01) | |

(52) U.S. Cl.
CPC ........... *E21B 33/138* (2013.01); *E21B 33/14* (2013.01); *E21B 37/00* (2013.01); *E21B 47/117* (2020.05)

(58) Field of Classification Search
CPC ............................. E21B 33/138; E21B 33/14
USPC .................................................. 166/250.01
See application file for complete search history.

(56) References Cited

U.S. PATENT DOCUMENTS

| | | | |
|---|---|---|---|
| 5,712,314 A | 1/1998 | Surles | |
| 10,787,880 B2 * | 9/2020 | Wehrenberg | ........... C09K 8/426 |
| 11,578,252 B2 * | 2/2023 | Larsen | ...................... C09K 8/64 |
| 2005/0025777 A1 | 2/2005 | Pohlmann | |
| 2005/0109502 A1 * | 5/2005 | Buc Slay | ............... B82Y 30/00 |
| | | | 166/179 |
| 2007/0125276 A1 | 6/2007 | Reddy | |
| 2007/0181224 A1 | 8/2007 | Marya | |
| 2008/0200352 A1 * | 8/2008 | Willberg | ................ C09K 8/516 |
| | | | 166/280.1 |
| 2009/0126932 A1 | 5/2009 | Robinson | |
| 2016/0376884 A1 * | 12/2016 | Al-Nakhli | ............... E21B 47/06 |
| | | | 166/300 |
| 2017/0253788 A1 | 9/2017 | Ivanov | |
| 2017/0349747 A1 | 12/2017 | Sherman | |
| 2018/0265682 A1 | 9/2018 | Roy | |
| 2021/0187604 A1 | 6/2021 | Sherman | |
| 2022/0056330 A1 | 2/2022 | Ghebremeskel | |
| 2023/0323187 A1 | 10/2023 | Christanti | |

\* cited by examiner

*Primary Examiner* — William D Hutton, Jr.
*Assistant Examiner* — Ashish K Varma
(74) *Attorney, Agent, or Firm* — Randal D. Homburg (57) ABSTRACT

A method and process for temporarily plugging wellbore conductivity using a forced injection of an encapsulated reactive metal having a polymeric coating into perforation tunnels of a target existing wellbore and a second injection under pressure of a swelling elastomeric compound to seal perforated tunnels in a producing wellbore to prevent or minimize frac-hit or frac-bashing to adjacent intersecting wellbores and fracture networks, until such predetermined time as the risk of frac-hit is resolved, the reactive metal becomes exposed, creating the corrosive degradation of the reactive metal and swelling elastomeric compound to decay and further flushed from the perforation tunnels and wellbore to reinstate production flow.

8 Claims, 7 Drawing Sheets

METHOD FOR TEMPORARY CLOSURE OF PERFORATION TUNNELS

I. BACKGROUND OF THE INVENTION

1. Field of Invention

A product mixture and method for temporarily plugging wellbore conductivity using an injection of an encapsulated active metal having a polymeric coating into perforation tunnels of a target existing wellbore and a second injection under pressure of a swelling elastomeric compound to seal perforated tunnels in a producing wellbore to prevent or minimize frac-hit or frac-bashing to adjacent intersecting wellbores and fracture networks, until such predetermined time as the risk of frac-hit is resolved, the reactive metal becomes exposed, creating the degradation of the reactive metal and swelling elastomeric compound to decay and further flushed from the perforation tunnels and wellbore to reinstate production flow.

2. Description of Prior Art

A preliminary review of prior art patents was conducted by the applicant which revealed prior art patents in a similar field or having similar use. However, the prior art inventions do not disclose the same or similar elements as the present granulated and fibrous swelling elastomers and method of use as disclosed herein, nor do they present the material components in a manner contemplated or anticipated in the prior art.

In U.S. Pat. No. 11,578,252 to Larsen, a method and composition for treatment fluid introduction into a wellbore penetrating a subterranean formation using a liquid composition including a base fluid and composite diverting particulates comprising a degradable polymer and an oil-based material to partially plug a zone in the subterranean formation, serving the purpose of introducing fluid away from the zone. However, there is no intentional degradation of temporary plugging, nor any intended purpose of prevention of damage to adjacent wells contemplated nor anticipated in this patent, nor included steps for thermal degradation combined with a chemical decomposition reaction from high temperature water flushing.

In U.S. Pat. No. 10,787,880 to Wehrenberg, the present inventor identified method for sealing perforation tunnels in a well including the steps of pumping an initial volume of fluid into a well, mixing an expandable material into a carrier fluid to form an expandable fluid mixture, pumping the expandable fluid mixture into the well to force the expandable material into the perforation tunnels in the well, and holding the expandable material under a hold pressure in the perforation tunnels for a cure period to form perforation plugs. Again, this method does not introduce any steps for degradation of the expandable plug materials after cure.

A method is disclosed in U.S. Patent Application Publication No. 2018/0265682 to Roy, which includes polymerizing a blend of materials which include a polymeric material and a degradable alloy material to form a degradable component from the polymerized blend of materials. Apportion of the method includes exposing the degradable component to water where the degradable alloy material reacts with the water to at least in part degrade the component. It is held for use in sensing operations, drilling operations, cementing operations, fracturing operations and production operations. It requires the use of mechanical plugs to block passages during the method, these plugs having a rubber or silicon seal. The plugs are given by example as balls, cylinders and form molded flexible parts and seated rings. These are referenced a TPE (thermoplastic elastomers) or NBR or other rubber compounds.

The reactive particle composition include aluminum, gallium, indium, tin, bismuth, zinc, mercury, lithium, sodium and potassium, in varied shapes, sizes, powders, solids and percentages serving as the degradable alloy component.

U.S. Patent Application Publication No. 2017/0253788 to Ivanov discloses numerous variations of shaped uniform particles included is a treatment fluid, including geometric three dimensional shapes including cylindrical, spherocylinder and polyhedral shapes and tetrahedrons which are degradable and fluids which include proppants, fibers, flakes and particulate materials. These also include particles having a rigid core and a film or fibrous coating.

A method of well treatment is disclosed in U.S. Patent Application Publication No 2008/0200352 to Willberg. It comprises the injection of a slurry of a degradable material, allowing the degradable material to form a plug in one or more perforations, fractures or wellbores in a well penetrating of a formation, performing the downhole operation and allowing the degradable material to partially or fully degrade after a selected duration such that the plug disappears. A polymer appears to be mixed with a particulate to form the degradable material, the polymer selected from lactic acid, glycolide, polylactic acid, polyglycolic acid, and amide, the degradable material is a fiber and the particulate material is a degradable proppant, with an additive to either accelerate or delay the degrading step of the method. The method simply states that the degradation passively occurs, unlike the present degradation caused by heat and water and performed actively.

II. Summary of the Invention

Currently in oil and gas application, there is a newly encountered problem occurring often with catastrophic consequences of an adjacent wellbore being "frack-hit" or "frack-bashed". These inter-well interference events are caused by nearby fracking activity to which the new fracturing planes intersect adjacent wellbore or existing frack networks to which newly exerted frack pressures are being applied to the adjacent wellbores or fracture matrix. Commonly, this results in complete loss of wellbore access of the adjacent wellbore causing casing collapse in the adjacent well taking the frack-hit and/or complete production loss of the adjacent affected well. This is most commonly exacerbated as more pad well designs or clustered wellbore designs are incorporated into fields, as well as where oil and gas operators are drilling more infill wells. These more common designs are generally the result of a more efficient extraction of oil and gas productions and extension of existing wells into new production sources.

In order to minimize the frack-hit or frack bash to existing adjacent wellbores or commonly shared fracture zones, above and below the new fracking occurrences, a new degrading particulate encapsulated reactive metal in initially injected under pressure into the target perforation tunnels and secondarily with a temporary swelling elastomer agent is applied to the same perforation tunnels in the producing wellbore sequentially and selectively (Parent Well), for a period to allow the swelling elastomeric agent to undergo a pressurized swelling time wherein the temporary plugging of all perforations are sealed off. After this plugging has occurred, pressure is applied to the Parent Well equal to the frack treating pressure of an adjacent well (Child Well)

being fracked. Once the pressure is equal, negative effects of any potential frack hit have been eliminated and the fracking can occur without any negative effect to the Parent Well due to the plugging of the perforations using the temporary swelling elastomer. After the fracking in the Child Well has concluded, the pressure is removed from both the Parent Well and the Child Well, wherein a initial degradation process occurs and thereafter an introduction of a pressurized flushing from a water source causing degradation after a predetermined lapse of time causing a further accelerated corrosive breakdown between the reactive metal and brine or high chloride water which further decomposes the accelerated degradation of the temporary swelling elastomeric agent reducing it into broken particulates to be eliminated from the perforation tunnels and the wellbore, restoring the original perforations, using the flushing water to remove the now waste materials from the Parent Well. The reactive metal corrosion occurs through galvanic processes with the brine water or by pitting corrosion or electrochemical corrosion.

It is further contemplated that the temporary swelling elastomeric agent could be enhanced by a particulate fibrous component that could include alkali metal core particles encased in an elastomeric chemical to form the temporary swelling elastomeric agent which has quality of swelling when placed in an ambient temperature quantity of water prior to introduction into the wellbore with a limited period of time to swell, complete its swelling and then decay over a contemplated period of time which can be further accelerated upon exposure to a heated water source using temperature which can be retrieved from the downhole area of the well or introduced at the surface using available heat sources, which causes the temporary swelling elastomeric agent to be broken up, exposing the reactive metal core particles, causing the alkali metal core particle to corrosively decay by a chemical exothermic reaction. It is also contemplated that a non-reactive fibrous material can be mixed into the temporary swelling agent to act as a binder to form a mixture of the temporary swelling elastomer agent or the elastomer chemically coated alkali metal core particles.

It is also contemplated that secondary positive attributes can occur to the formation lithology. It is theorized that by pressuring upon the Parent Well casing, small capillary fractures may close up, which can lead to an increase in the reservoir pressure, which can positively affect the nearby Child Well, as well as leading to beneficial results to the entire geological formation production and oil recovery operations nearby.

III. Description of the Drawings

The following drawings are submitted with this utility patent application.

FIG. 5 is a diagram of the spherical magnesium alloy pellets under pressure through the casement and initially packed into the individual perforation tunnels.

FIG. 6 is a diagram of the swellable elastomeric compound under additional pressure into the individual perforation tunnels packed within voids between the packed spherical magnesium pellets filling spacing voids between the spherical magnesium pellets under pressure.

IV. Description of the Preferred Embodiment

A process and product composition for the protection of an existing production oil or gas well X adjacent to a location where pressurized fracking is being conducted, provide downhole materials to plug perforation tunnels D through well casing B or casement, concrete C and into a shared and common geological formation E as an adjacent well, not shown, intended to be fracked in the common geological formation E form a "frac-hit" caused by unequal pressures being exerted on the existing production oil or gas well X that could collapse the geological formations shared in common between the wells, causing irreparable damage to the existing production oil or gas well X, FIGS. 1-8. For purposes of this specification, we may refer to the production well X to be protected from the "frac-hit" caused by pressures involved in fracking of the adjacent well, not shown. This definition has been commonly used in the oil and gas fracking industry, but it is specifically used herein to draw distinction between the two wells within this specification. The adjacent well is not affected by this method or its products, so it is merely reference periodically as the source for the causal means for which protection of the production well X is necessitated.

The process defined in this protective application involves several steps, but first, the materials used will be defined, also as used within the specification and claims. A first material, FIGS. 1-3, and 5-7, is called a well protection material 20, comprising reactive metal alloy pellets 22, preferably a magnesium alloy pellet, having a variable layered polymeric coating 24 of one or more shapes and sizes. These are commercially available products already existing which are readily available for purchase, with variable thickness polymeric coatings 24 resistant to water for a pre-determined decay time period as anticipated for penetration of water and pressure through the polymeric coating to result in a predictive decay of the polymeric coating 24 to expose the magnesium alloy pellet 22 to brine water, chlorinated water, hot water or other decay stimulating liquids, resulting in corrosive decay of the reactive metal particle/magnesium alloy pellet 22 later involved in the of the removal process.

A second material is generally called the mix material 30, FIG. 4, 5-7, comprising an expanding elastomeric material made of non-uniform shreds of a swellable elastomeric compound that swells under pressure and is deformable and injectable under pressure to fill voids in particulate material forming a packable compound. This expandable elastomeric material or swellable elastomeric compound, in one embodiment known as chemically suited for the disclosed process, is commercially available under the name SWELLFRAC™ and provided in fine, course and super course sized segments. In addition, the mix material may also include organic fibrous material 32 for additional strength.

Figure 4:
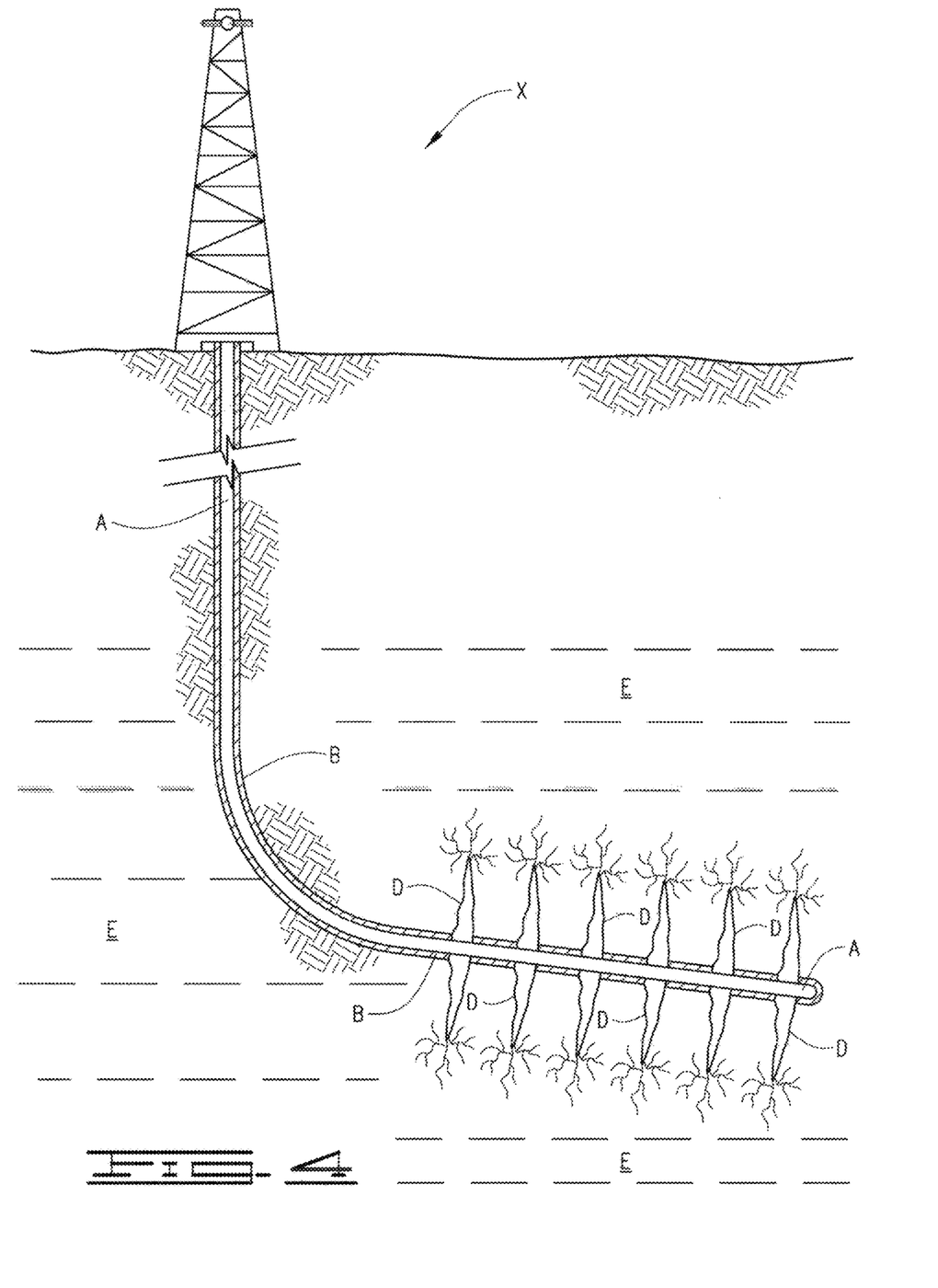
FIG. 4 is diagram of a wellbore and perforation tunnels after preparation for the application of the temporary application of the spherical magnesium alloy pellets and the subsequent swellable elastomeric compound.

Further definitions included in the process for reference will also include generic components of the wells to which the process will be applied, FIG. 4. The well bore A is the primary underground tunnel that has been drilling into the ground for the extraction of oil or gas from certain oil and gas bearing geological formations E, most generally and initially a vertically initiated entry bore at a ground surface which has been drilled either vertically or horizontally to a depth desired by the drilling crew. The well bore A eventually terminates to a bottom hole and/or directional bores at or near the end of the drilling process and may or may not be the lowest location in the drilling operation. The well bore A, upon completion of the drilling, is lined with casing B that is set in the well bore A by external concrete C within the geological formation E, which is then penetrated by explosives at one or more locations to form perforation tunnels D between the casing B, through the concrete C and into the geological formations E, FIGS. 4-8. These perforation tunnels D extend vertically, horizontally or a combination of both in common directional drilling, wherein the well bore A, still firmly set within the geological formations E, allow external flow of oil and gas products to be extracted from the production well X, FIGS. 4-8.

Often, in order to enhance the flow, pressure and liquids under pressure for release from the geological formation E or to increase the flow and amounts of these oil and gas deposits being extracted, fracking is enlisted using pressurized water, chemicals and/or organic acids to decompose minerals or fracture layers of geological strata within the geological formation E through which it exists, the fracturing spreading apart certain layers of oil and gas containing minerals and mineral layers to optimize oil and gas flow. As disclosed above, quite often adjacent wells commonly share access to the oil and gas containing layers, wherein fracking pressure on one well can negatively affect the pressure on another production well, defined as a "frac-hit", which is defined as damaged caused to the production well X caused by an unequal pressure from the well being fractured which results in damage or irreparable destruction and collapse of the geological formation E surrounding the production well X or sometimes destroy an adjacent production well, as a result of this "frac-hit", which ceases or restricts the flow of oil or gas to the production well X. These terms above will be used in the description of the method or process which prevents this "frac-hit" to the production well X.

The first step required would be to clean out the production well X that is being subjected to the following method or process and removing as much of the oil and/or gas residuals that are in the well bore A and the perforation tunnels D being treated. Once these production fluids are removed, a water purge would be optional to flush the production well X all the way to the surface and remove the remaining fluids. The next step would be to perform an injection test to establish that the well bore A and perforation tunnels D can retain pressure in the later steps, equal to or more than the pressure which will be used in the adjacent well being fracked.

Introduction of the well protection material 20, preferably the coated magnesium alloy pellets 22 selectively chosen for the polymeric coating 24 in consideration of the time it predictively takes to perform the pressure balancing and the fracking operation of the adjacent well, is pumped down the wellbore A and allowed to be screened into the perforation tunnels D under pressure to allow penetration outside the penetration tunnels into the production strata of common geological formation E, FIGS. 5-6. This step, FIG. 7, is completed when a sufficient amount of the well protection material 20 is injected through and imbedded into the penetration tunnels D causing a significant and desired increase in the injection pressure monitored by the process engineers, letting the process engineer know that the tunnels are sufficiently screened with the well protection material 20.

Figure 7:
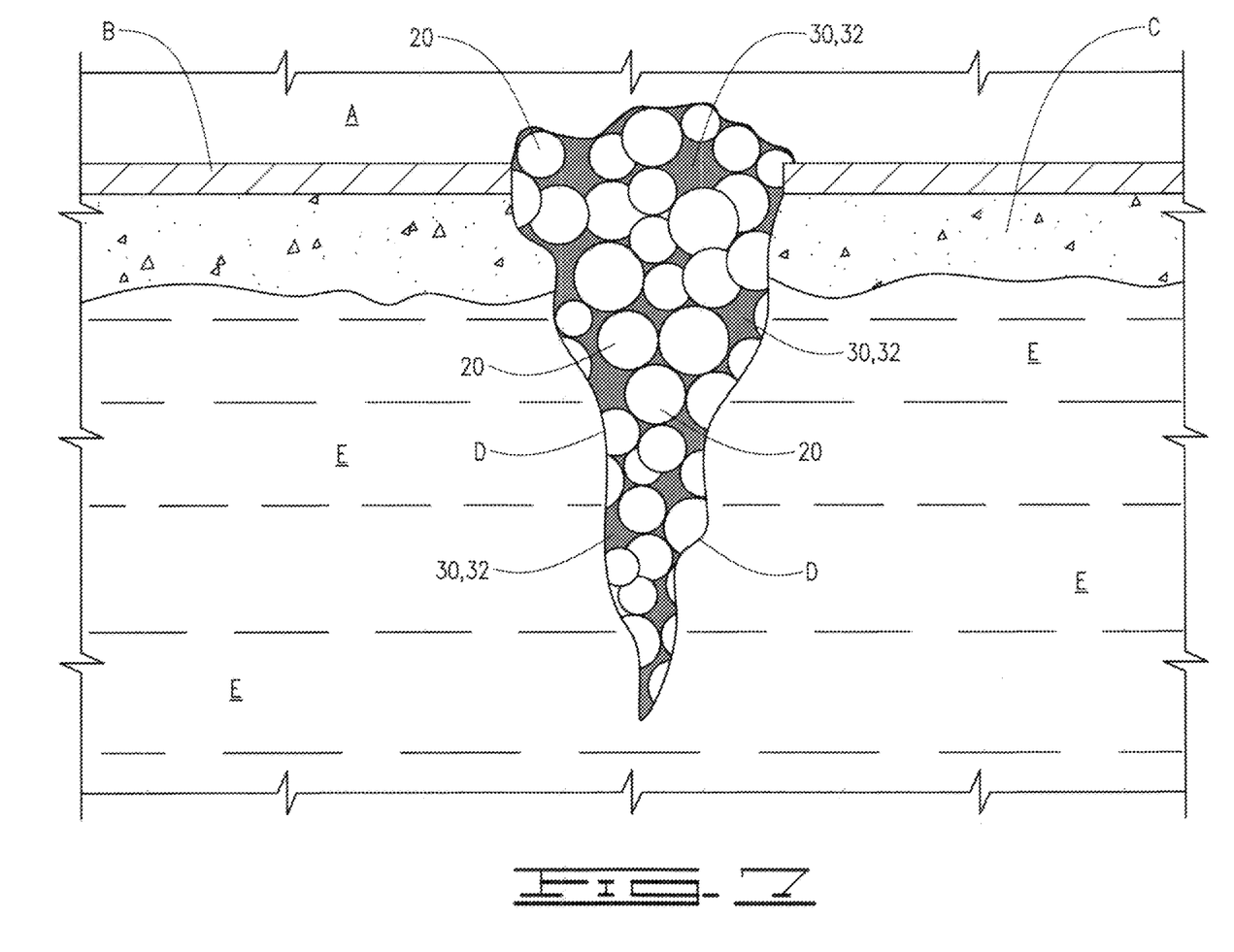
FIG. 7 is a diagram of an isolated perforation tunnel showing the swellable elastomeric compound and the spherical magnesium pellets fully packed within the perforation tunnel during the adjacent well fracking operation and at full equalization pressure.

Next, the mix material 30 is introduced comprising a mix of the fine, coarse and super coarse shreds are pumped under pressure to screen out and pack off into permeable voids created within in the well protection material 20 packing locations, FIGS. 6-7. Once a sufficient quantity of the mix material 30 is packed into the perforation tunnel D locations and permeable voids, another dramatic pressure spike up to a completing pressure up will occur, as determined by the process engineers. At this point in the process, temperature and water will begin swelling out the mix material creating impermeable plugs, FIG. 7.

After the fracking of the adjacent well has been complete and its pressure is removed, the equal pressure in the well having been treated with the plugged pressure, the mix material 30 and well protection material 20 become subjected to a degrading process. The first step in the degrading process starts when hot water, brine water or high chlorine water is circulated through the wellbore A to elevate the temperature of the circulating water up to a bottom hole temperature throughout the wellbore A, casing B, perforation tunnels D and geological formations E. The selected well protection material 20 commences destabilization upon exposure to the circulating hot water and, depending on the type and thickness of the polymeric coating 24 encasing the magnesium alloy pellets 22, may selectively dissolve the polymeric coatings in a matter of hours, days, weeks or longer.

Figure 1:
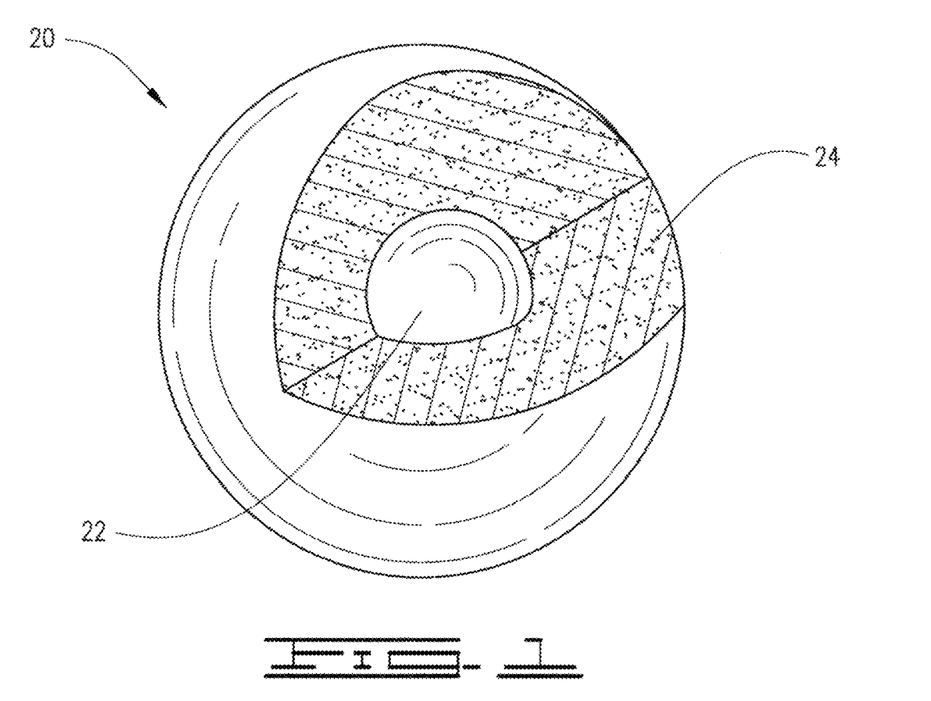
FIG. 1 is a cutaway view of a spherical magnesium alloy pellet encased within a temporary polymeric coating.
Figure 2:
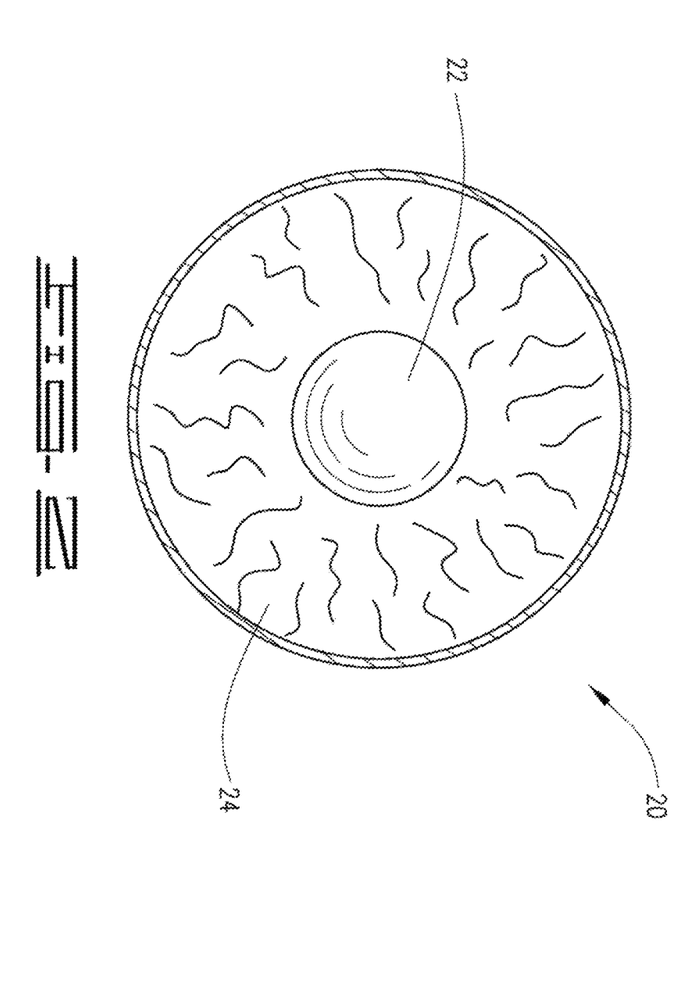
FIG. 2 is a cross section of FIG. 1.
Figure 3:
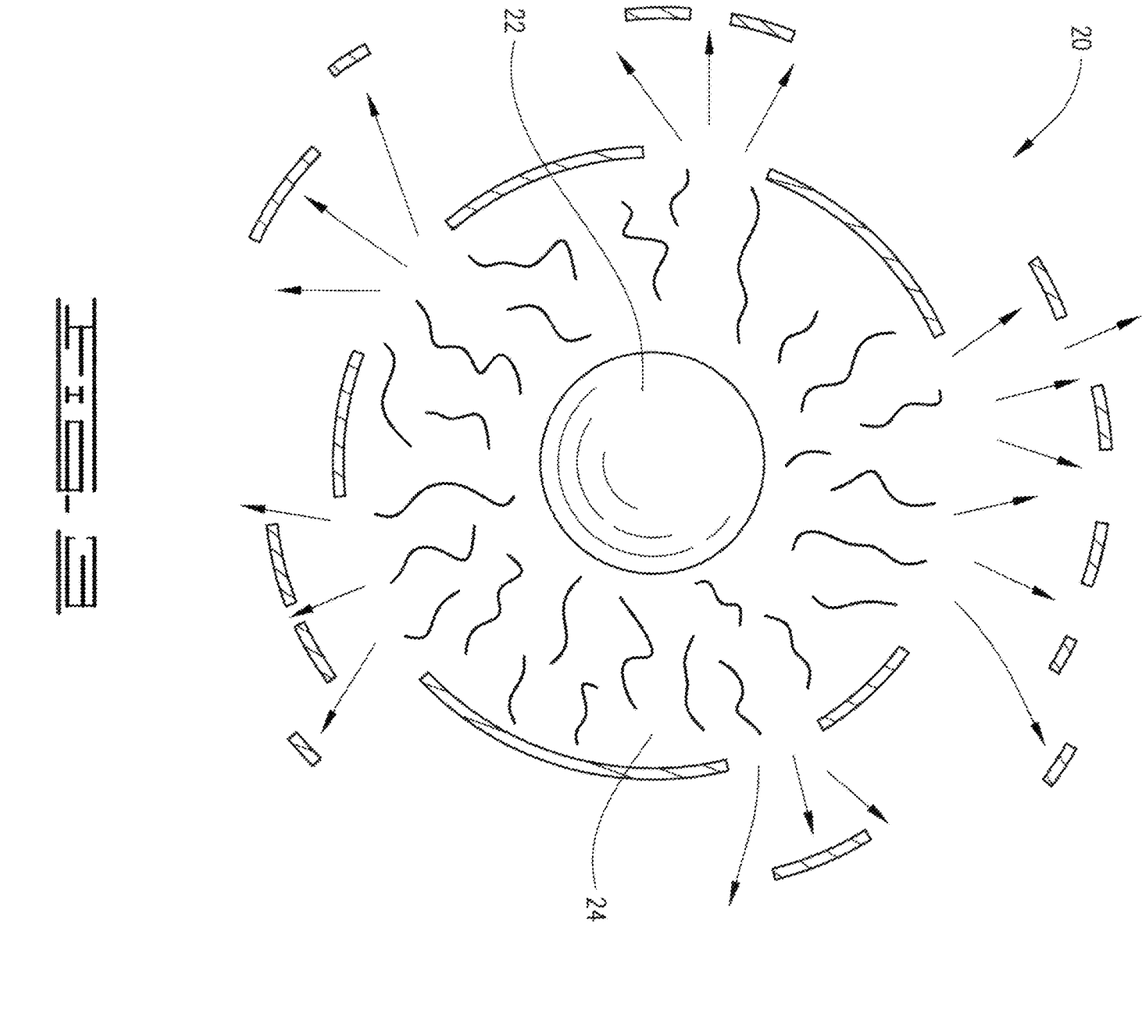
FIG. 3 is a view of the spherical magnesium alloy pellet undergoing a corrosion due to chemical reactions once water has breached the temporary polymeric coating.
Figure 8:
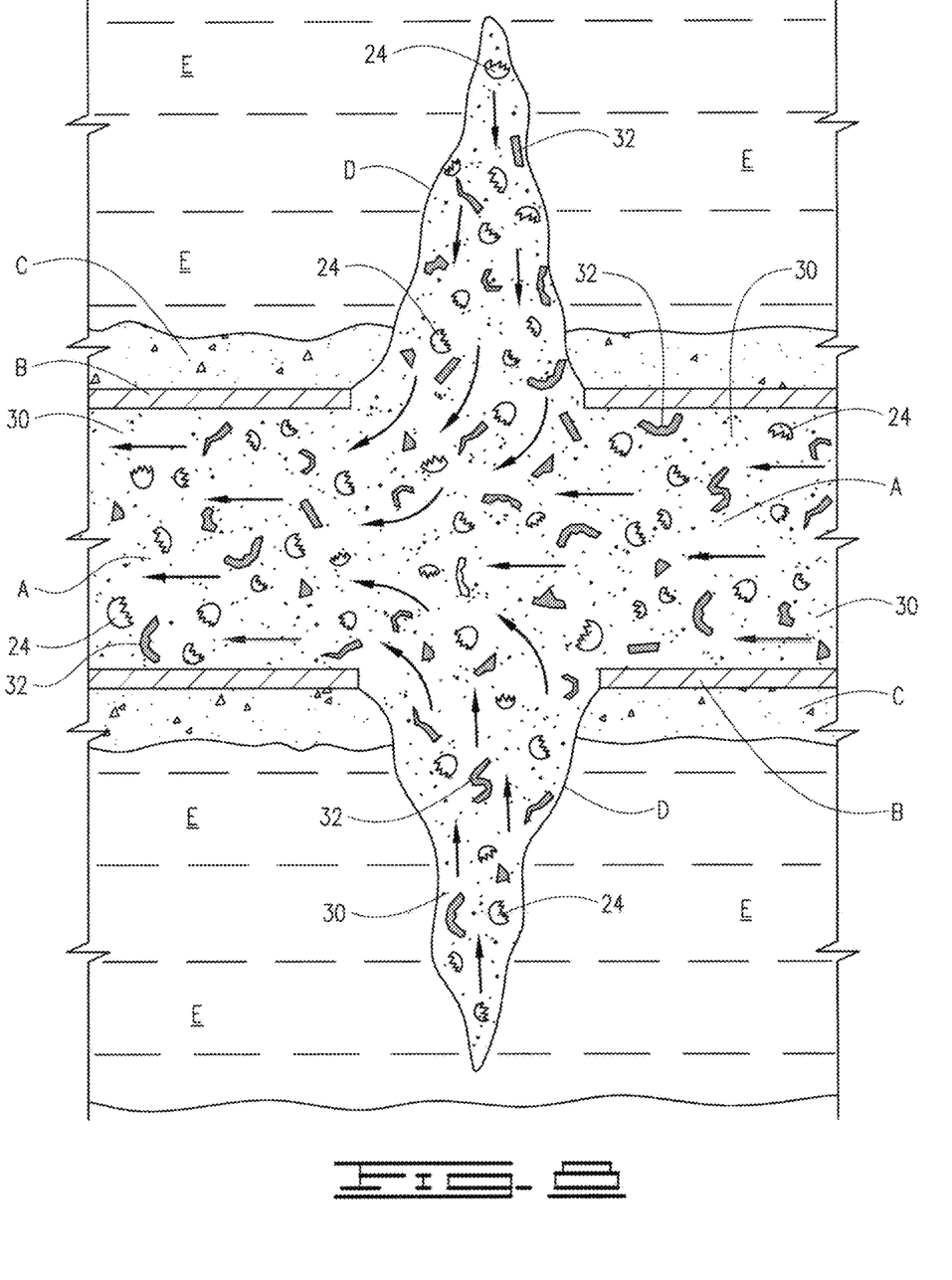
FIG. 8 is a diagram of the removal of the exploded spherical magnesium pellets and the decayed swellable elastomeric compound at the time the perforation tunnels are evacuated of debris prior to restoration of production flow to the subject well.
Figure 11:
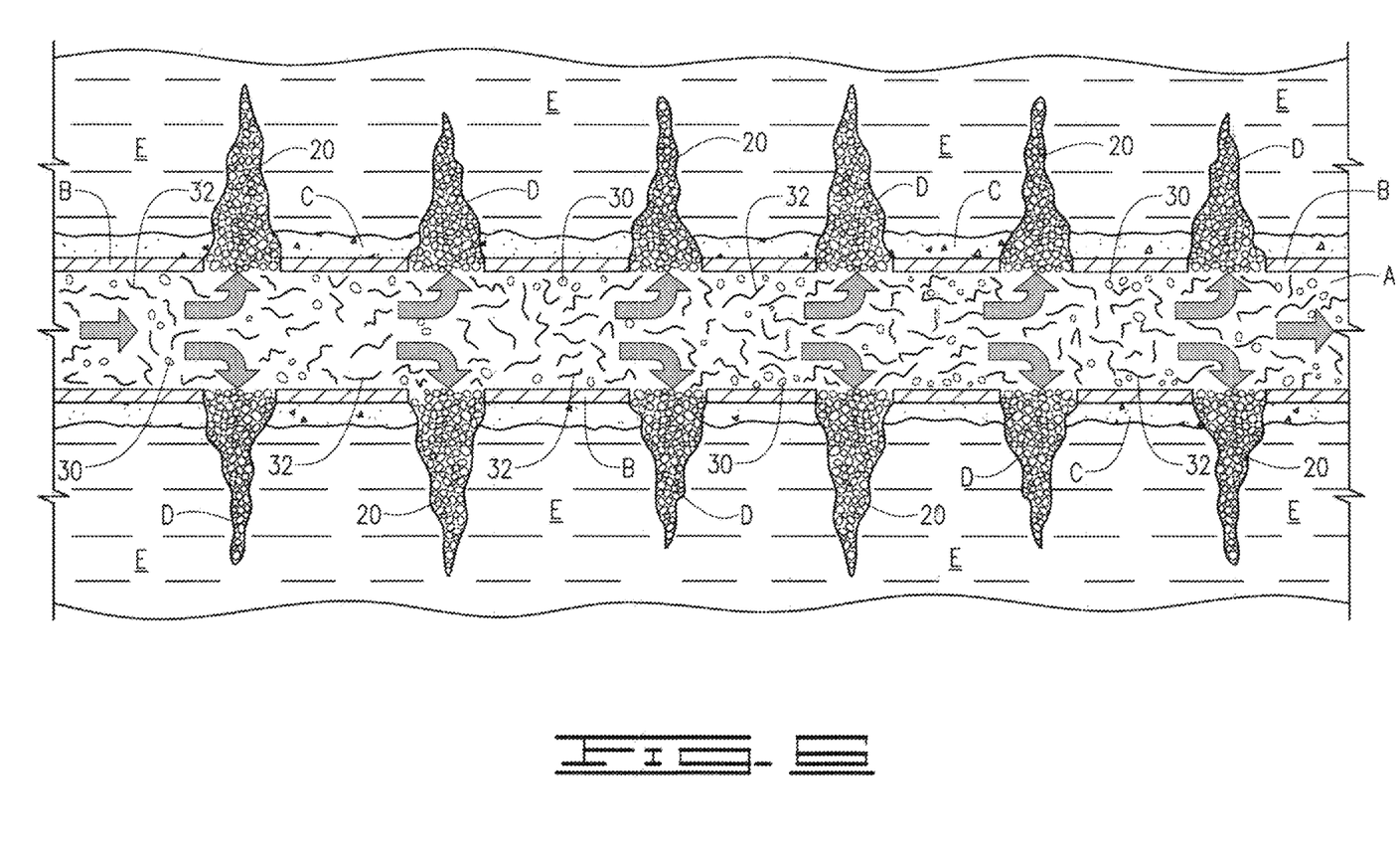

Once the well protection materials 20 start to destabilize and dissolve, FIG. 8, the exposed magnesium alloy pellets 22 react in a manner where it is degraded by a corrosive and exothermic electrochemical reaction, FIG. 3, caused by its exposure to the water, leaving pitted corrosive voids causing the material mix to fail due to the magnesium alloy pellets 22 becoming porous and unstable due to the loss of structural integrity loss of the plugs, FIG. 8. The final step is to purge the production well's well bore A and perforation tunnels D by pressurized flow flushing to remove any remaining plug materials and evacuate those materials prior to restoration of production flow from the clear well bore A, having no resultant "frac-hit" damage to it having been protected from such occurrence by the presence and protection of the plugged materials having been safeguarded by the protective process ensured by the equalization of pressure on the oil and gas bearing adjacent and common geological formations E.

The magnesium alloy pellets 22 are not intended to undergo any exothermic reaction in the presence of sodium or other derivative salts, instead decaying and reacting in the presence of abundant acidic liquids and/or hot water. In the presence of the acidic or hot dissolving liquids during the final method phases, the polymeric coatings 24 are slowly reduced in thickness by dissolution down to a point where communication is gained to the reactive metal alloy pellets 22, wherein the polymeric coating 24 finally gives way and the plug comprised of the cured well protection materials 20 break apart and decomposes into smaller fragments and the remnant well protection materials 20 are flushed from the their locations and flowed out of the production well X.

Additionally, not only are the well protection materials 20 injected under pressure into the previously disclosed production well X components, but they also are allowed to penetrate into other voids and crevices, including the annular space between the casing B and geological formation E, the annular space between the casing B and tubing, if any, and also as a temporary plug that can be left in the casing B. The well protection materials 20 may be left in place and not evacuated if elected by the operator of the method disclosed above as a means of stabilizing the well components, the seating of the casing B or the integrity of the geological formation E.

While the magnesium alloy pellets 22 are disclosed and referenced throughout this method and specification as is the primary and preferred reactive metal, it is further contemplated that the magnesium alloy may be replaced by other metal alloy pellets that possess the characteristics of being corrosively dissolved in high chlorine water, brine, salt water or other acidic liquid environment, including but not limited to magnesium oxides, aluminum, sodium, lithium, potassium, rubidium, cesium and francium. In this alternative, the polymeric coating 24 may be adjusted to be suited to the alternative reactive metal alloys to provide more or less time to protect the alternative reactive metal from premature or late dissolution.

The polymeric coatings 24 can be variable, but it is preferred that the polymeric coating 24 be chosen from full or partial compositions to include known high strength polymers including but not limited to PLA, PTEG, PC (polycarbonate), nylon, ABS, KEVLAR®, PTB and similar classified polymers. The thickness of the polymeric coating 24 may also be varied to conform the an appropriate predictable rate of decay and the environment of each production well X, such polymeric coating 24 being applied at the time of manufacturing of the polymerically coated reactive metal pellets. For example, the polymeric coated reactive metal pellet could by supplied to commence decay in hours, days, weeks, or never, or other engineered predictable time periods, and selectively purchased accordingly.

It is further contemplated that the well protection material 20 may not include the reactive metal alloy pellets 22 and may be entirely comprised of the polymeric coating 24 materials, especially where the well protection material is not intended for removal, as in the case of certain annular voids. In this variation, the entire well protection material 20 would be a solid particle made of the mentioned in the previous paragraph, especially the PLA, nylon and other synthetic polymers.

The preferred fibrous material 32 would be a non-continuous fiber so that it is easily dispersed upon degradation of the well protection materials 20 and mix material 30 within which it is woven for forming the binding matrix. Generic fibrous materials 32 would be selected from a group of materials comprising natural fiber, synthetic fiber, organic fiber, inorganic fiber, high tensile strength, a mixture of fibrous materials, a uniform mixture of fibers, waste fiber materials and any other fiber which provide additional structural integrity to a homogeneous mixture of the mix material 30 and the well protection materials 20. The fibrous material 32 may be natural or synthetic fibers which pose no environmental or health hazard, excluding products containing fiberglass or asbestos, mostly selected from plant or animal sources. Examples of naturally occurring fibers useful in the well protection materials 20 and mix material 30 are cotton, wool, jute, sisal vegetable fiber or hemp. Examples of useful synthetic fibers are basalt, nylon, polyester, or wollastonite, all the above noted for their tensile strength when used in other products. These fibrous materials 32 have been used for strengthening concrete in the same manner as would be anticipated in the well protection materials 20 and mix materials 30.

It is also contemplated that the insertion of the well protection materials 20 may be phasic or may be applied all at once as a homogeneous mixture. As example, the polymeric coated reactive metal components could be applied first with the mix material 30 (SWELLFRAC™) and fibrous materials 32 added later under greater force to withstand and maintain the required high pressure integrity. It is also contemplated that different polymeric coated reactive metals may be used within the same process with one thickness and predictable timed decay in one or more parts of the production well X, while in another portion of the production well X, wellbore A, casing B, concrete C, perforation tunnel D, annular spaces, or geological formation E, another different thickness and predictable timed decay polymeric coated reactive metal component is used. Each production well X should be given specific and subjective consideration by the production engineer to ensure that a reliable result is obtained during the use of each temporary plugging operation, since every hour spent in the oilfield is expensive, costly and time consuming.

Modification of the process is subject to the degrading times by changing the chemistry and or temperature of the water in the production well X. In addition, additions of a liquid acid component, high chloride containing water, heated water or introduction of hydrocarbon based fluids and solvents may be used to modify or later the degradation steps in the process. It is also possible that more or less steps may be necessary depending on the production well X conditions, the existing perforation tunnel D conditions, thermal variables, depth of the well bore A, geological implication and variables, mineral composition of the geological formations E, altitude, air pressure and other variable that commonly effect oil and gas production.

While the invention processes and products have been particularly shown and described with reference to a preferred embodiment thereof, it will be understood by those skilled in the art that changes in form and detail may be made therein without departing from the spirit and scope of the invention.

What is claimed is:

1. A method for the protection of a production well adjacent to or sharing a geological formation as an adjacent well incurring well fracture to protect said production well from potentially damaging fracture pressures of the adjacent well, known as "frac-hit", said method comprising the steps of:
    cleaning the production well using circulating fluids to remove oil and gas residuals within said production well wellbore, casing perforation tunnels and geological formation where production activity has occurred;
    performing a first injection pressure test to determine if said wellbore, casing, perforation tunnels and communicating geological formation can retain pressure;
    introducing a quantity of well protection materials under pressure and ambient temperature water, comprising water reactive metal pellets having a polymeric coating with a predictable rate of decay over time upon exposure to acidic liquids into said wellbore, casing, concrete, perforation tunnels, and geological formation;
    introducing a quantity of mix material defining non-uniform shreds of a swellable elastomeric material that swells under pressure of injection water to fill in any voids in said well protection materials or annular voids within said casing, concrete perforation tunnels and geological formation until such mix material and well protection materials are set and stabilized to withhold a stable pressure;

applying sustained pressure to said production well wellbore, casing, perforation tunnels and geological formation equal to and including pressures of any fracturing procedures applied to said adjacent well have been conducted and completed, avoiding production well damage caused by said "frac-hit";

removing said pressure from said production well;

circulating acidic water, hot water, brine or chlorinated water through said wellbore to cause further decay of said polymeric coating surrounding said reactive metal pellets, directly exposing said reactive metal pellets to said circulating water resulting in an exothermic electrochemical corrosive reaction and pitting corrosion to said reactive metal pellets to commence a rapid decay and destabilization of said well protection materials and mix material to break up into smaller particles of materials;

flushing all remnant portions of residual decayed well protection materials and mix mixture from said wellbore; and restoring production flow of oil and or gas to the production well.

2. The method for the protection of a production well adjacent to or sharing a geological formation as an adjacent well incurring well fracture of claim 1, said well protection material further comprising:

magnesium alloy pellets having a uniform size and shape; and said polymeric coating having a predictable decay rate and coating said magnesium alloy pellets in a predictable and uniform rate of decay when exposed to hot water, brine, acidic liquids or highly chlorinated water.

3. The method for the protection of a production well adjacent to or sharing a geological formation as an adjacent well incurring well fracture of claim 1, said mix material includes a fibrous materials to enhance the integrity of said mix material and said well protection materials when set.

4. The method for the protection of a production well adjacent to or sharing a geological formation as an adjacent well incurring well fracture of claim 1, said reactive metal alloys selected from a group comprising:

magnesium, aluminum, sodium, lithium, potassium, rubidium, cesium and francium, or other reactive metal, alkali or not, which corrode and become pitted, and destabilize structural integrity in the presence of hot water, ambient water, brine, salt water or acidic liquid.

5. The method for the protection of a production well adjacent to or sharing a geological formation as an adjacent well incurring well fracture of claim 1, said polymeric coatings are full or partial compositions to include known high strength polymers including selected from a group comprising:

PLA, PTEG, PC (polycarbonate), nylon, ABS, KEVLAR®, PTB and similar classified polymers having a thickness varied to conform the an appropriate predictable rate of decay and the environment of each said production well, said polymeric coatings being applied at the time of manufacturing of said well protection materials, said rate of decay of said polymeric coating determined by exposure to hot water during said method, acidic liquids, highly chlorinated water and brine to commence decay of the polymeric coatings within hours, days, weeks, or never, or other engineered predictable time periods, and selectively chosen accordingly.

6. The method for the protection of a production well adjacent to or sharing a geological formation as an adjacent well incurring well fracture of claim 1, said mix material includes a fibrous materials to enhance the integrity of said mix material and said well protection materials when set, said fibrous materials selected from a group comprising:

natural fiber, synthetic fiber, organic fiber, inorganic fiber, high tensile strength materials, natural or synthetic fibers which pose no environmental or health hazard, cotton, wool, jute, sisal vegetable fiber, hemp, basalt, nylon, polyester, or wollastonite, all the above noted for their tensile strength when used in other products.

7. The method for the protection of a production well adjacent to or sharing a geological formation as an adjacent well incurring well fracture of claim 1, wherein said hot water circulated through said well bore may be amended to include additional liquid acids, high chloride containing water, or environmentally acceptable hydrocarbon solvents and fluids which have the capacity to accelerate the decay of said polymeric coatings to modify and greatly reduce the decay times and degradation steps disclosed in the method.

8. The method for the protection of a production well adjacent to or sharing a geological formation as an adjacent well incurring well fracture of claim 1, wherein some or all of said mix material and well protection material inserted within said well bore is left within annular spaces between said casing and said concrete, casing and geological formations, within said perforations tunnels or other non-specified voids as a means of stabilizing said wellbore components, casing seating or integrity of said geological formations where desired.

* * * * *